United States Patent Office 3,288,979
Patented Nov. 29, 1966

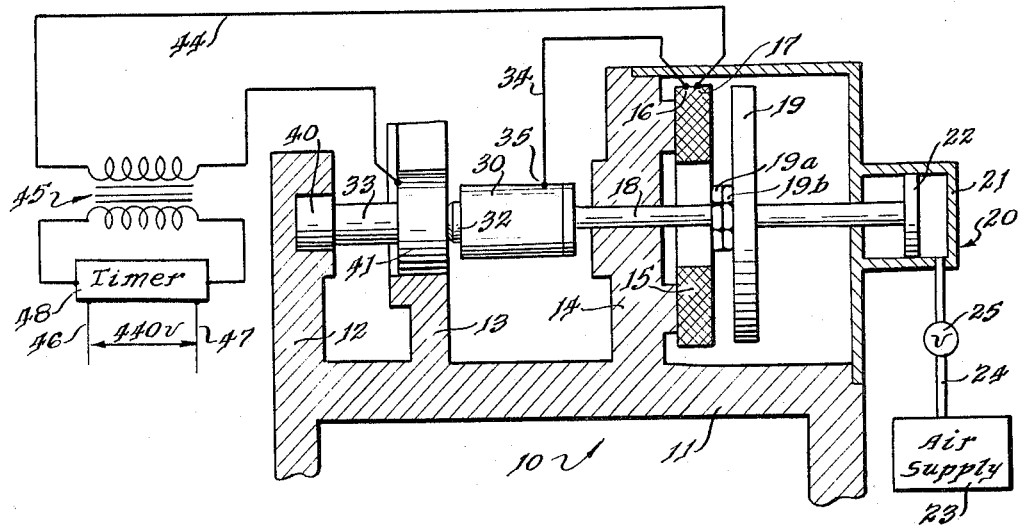
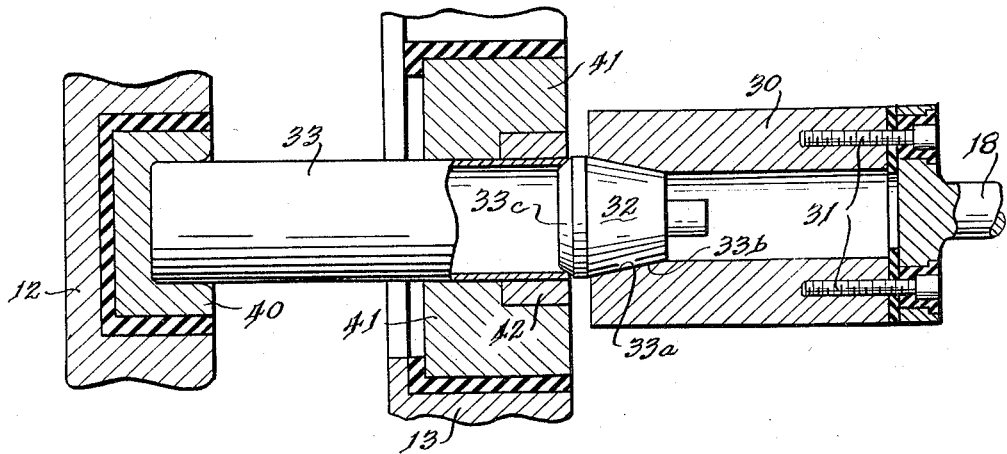
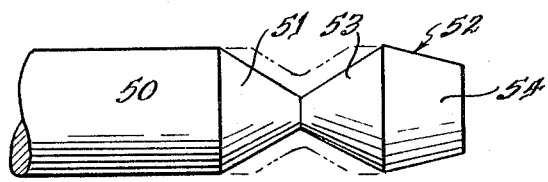

3,288,979
GRAPHITE WELDING
Loring E. Mills, Kennewick, and Richard F. Boolen, Richland, Wash., assignors to the United States of America as represented by the United States Atomic Energy Commission
Filed Oct. 28, 1963, Ser. No. 319,622
8 Claims. (Cl. 219—104)

The invention relates to a novel method of welding graphite, more particularly to a method for welding graphite of high purity, known as nuclear graphite, to the same material in order to fabricate containers for fuel, fertile and control material in nuclear reactors.

Graphite has many properties favorable to its use as a containing material for nuclear reactor fuel, blanket and control elements, but progress along this line has been slowed by fabrication difficulties. Up until the present no satisfactory way has been found of sealing containers such as tubes of graphite with the high degree of reliability needed to confine fission products, and to prevent leakage of the coolant into the interior of such containers.

The commonest method of sealing graphite is heating it to around 800° C. and introducing a carboniferous sealing material such as pitch into the joint; this method might be more accurately described as brazing rather than welding, and does not produce a seal of sufficient strength to be acceptable for reactor use. Furthermore, this method introduces impurities which are objectionable because of their unfavorable nuclear properties.

True welding of graphite to graphite has been accomplished, but only using direct current and under quite extreme conditions of temperature and pressure such as those described in United States Patent No. 2,927,879. The cost of carrying out this type of process is high, and since graphite as a cladding material has to compete with other types of material that can be fabricated at a reasonable cost, a more economical method of welding graphite will have to be found if it is to receive serious consideration for nuclear reactor use on a commercial scale.

It is, accordingly, the general object of the invention to provide a practical, economical method of welding graphite.

It is a more particular object to provide a practical method of welding high purity graphite to like material in order to fabricate containers for fuel, blanket and control materials to meet the standards required for use in nuclear reactors.

Other objects will appear as the description proceeds.

According to the invention, graphite is welded to graphite at ambient atmospheric or even subatmospheric pressure by electrical resistance heating at certain densities simultaneously with a combination of pressures across the interface to be welded. The first of the two pressures is mechanical and the other is from an electromagnet in series with the electrical resistance heating current. The initial, or mechanical pressure, should be about 14,000 pounds per square inch and the additional pressure from the plunger of the electromagnet should be sufficient to keep the pressure constant at 15,000 pounds per square inch, which is critical for our welding process. The added pressure from the electromagnet brings the total pressure up to the critical value last mentioned, and it compensates for the reduction in contact pressure between the pieces at the joint as the interface between them becomes enlarged due to plastic deformation. If the interface is not normal to the direction of the pressures, these should be adjusted accordingly.

Using alternating current such as one of 60 cycles and a current density of from about 310,000 to about a million amperes per square inch of interface, we have been able to form graphite-to-graphite welds at the comparatively low temperature of 2500° C., which is far below the range of 4000° to 7000° C. needed for graphic welding in the previously known processes above referred to. Moreover, unlike previous methods, our method is one of brief duration, as little as 8 and not in excess of 50 milliseconds. This, combined with the low temperature, results in only minor heating of the pieces being welded an eliminates virtually all disturbance of their mechanical properties and crystal structure. At the same time, our method produces welded joints of extremely high dependability and soundness, as shown by tests including photomicrographs in which the welded areas present an extremely dense, uniform appearance, as if the material had undergone kneading by the process.

High speed motion pictures have established the fact that an explosion takes place as the current is first applied and an arc is established between the pieces being joined; this forces them apart briefly, and when the pieces are forced together again through the combination of pressures the arc is stubbed out and the graphite material in the interfacial area is in a plastic condition which permits the pieces to be joined. The current density limits above given are most critical since if they are exceeded the "explosion" blows away so much of the material that the process does not proceed properly, and if the current density is less the material is not made sufficiently plastic to join the pieces and allow the kneading action above mentioned to take place.

Reference is now made to the drawing:

FIG. 1 of which is a schematic, partly sectional view of the apparatus for carrying out the invention.

FIG. 2 is an enlarged partly sectional view of a graphite tube and cap immediately prior to being welded by the method of the invention.

FIG. 3 is an enlarged view of a graphite rod and core immediately prior to being welded by the method of the invention.

Referring to FIG. 1, the welding apparatus is designated generally by the numeral 10, and comprises a frame 11 having upward projections 12, 13, and 14.

Mounted on projection 14 is solenoid, or stator, 15 of an electromagnet having terminals 16 and 17, and coaxial with plunger shaft 18. Beyond stator 15 is soft iron armature 19, mounted coaxially on shaft 18. Stop nuts 19a and 19b are mounted on a threaded section of shaft 18 and by tightening them against each other armature 19 is firmly stopped from further movement in the direction of stator 15, the location of the stop nuts thereby regulating the force of the electromagnet when the solenoid 15 is actuated.

Plunger shaft 18 extends beyond armature 19 to mechanical pressure device 20, in this case gas cylinder 21 and piston 22 on the end of plunger shaft 18. Gas pressure from air supply 23 is carried into cylinder 21 by line 24 and controlled by valve 25.

At the other end of shaft 18 annular holder-electrode 30 is insulatively mounted by means of screws 31. As more clearly shown in FIG. 2, holder-electrode 30 holds graphite cap 32 as it is welded to graphite tube 33. A conical surface 33a in the electrode 30 engages a conical surface 33b in the cap 32. A conical surface 33c on the cap 32 is welded to the end of the tube 33. Conductor 34 carries current from terminal 16 of solenoid 15 to terminal 35 of holder-electrode 30.

During the welding graphite tube 33 is held in a stationary position by backstop insert 40 insulatively mounted in projection 12, and by annular holder-electrode 41 and its annular insert 42, the electrode 41 being insulatively supported by projection 13. Holder-electrodes 30 and 41 are made of hardened copper such as copper alloyed with tungsten, tungsten carbide and the like to increase heat resistance; they should have at least 50 percent of the electrical conductivity of pure copper. Insert 42 is made of material of even greater heat resistivity than that of holder-electrodes 30 and 41. Such a material is a copper base alloy containing tungsten carbide known as TC–53, available from P. R. Mallory Company.

The welding current circuit is completed by conductor 44 which leads from terminal 17 of solenoid 15 through transformer 45 to holder-electrode 41. Transformer 45 is connected to a source of alternating current by leads 46 and 47 and controlled by timer 48.

Referring to FIG. 3, the apparatus of FIGS. 1 and 2 may also be used to weld a solid graphite rod 50 with a truncated conical end 51 to a solid graphite piece 52 composed of two truncated cones 53 and 54.

*Example I*

The cylindrical tube 33 was of high-purity graphite known as nuclear graphite. This type of graphite is described in "Nuclear Graphite" by R. E. Nightingale, Academic Press, New York, 1962. The tube had an outer diameter of 0.551 inch and a wall thickness of 0.030 inch. One end of the tube and the solid circular cap 32 of the same material and the same diameter as the tube were abutted in an apparatus of the type shown in the drawings, in the manner therein shown in FIG. 2. The apparatus was enclosed in a vacuum vessel, containing an ambient pressure of about 25 microns of mercury. This pressure avoids bubble formation within the weld.

The initial pressure exerted by the gas cylinder 21 between the tube and cap was 14,000 p.s.i. A one cycle pulse lasting 16.6 milliseconds of 60 cycles per second alternating current at 18.3 volts was passed through the welding circuit, producing a peak current density of 310,000 amperes per square inch of interface between the tube and cap. Welding took place to form a bond between them. As it did so, the interfacial area enlarged by about four times, but the total force exerted between the tube 33 and cap 32 was somewhat more than quadrupled by the pull of the solenoid 15 on the armature 19 due to energization of the solenoid. Thus, the interfacial pressure was brought to 15,000 p.s.i. A micrograph taken of a cross-section of the bond showed a kneaded crystal structure at the interface, and definite graphite crystal alignment in the bonded area.

*Example II*

As shown in FIG. 3, the solid rod 50 was of high purity graphite, and its truncated cone 51 was ⅛" in diameter at its small end. The solid piece 52 was also of high purity graphite, and its cone 53 was ⅛" in diameter at its small end. The rod 50 and piece 52 were welded in an apparatus like that of FIGS. 1 and 2. The cone 54 on the piece 52 fit the inner conical surface 33a of the electrode 30. The welding apparatus was enclosed in a vessel filled with helium having a pressure of one atmosphere.

The initial pressure exerted by the gas cylinder 21 across the interface between the rod 50 and piece 52 was 14,000 p.s.i. The interfacial area with a diameter of ⅛" increased during the welding by a factor of about four which was compensated for by the pull on the armature 19 by the solenoid during its energization to produce a pressure of 15,000 p.s.i. across the interface. A two cycle pulse, lasting 33.2 milliseconds, of 60 cycles per second alternating current at 18.3 volts produced a peak current density of 560,000 amperes per square inch of interface between the abutted planes.

The bond produced by this procedure was sectioned and photomicrographed. The photomicrograph showed a dense, kneaded structure, and no evidence of disturbance of the crystal structure of the rod 50 and piece 52. The contact area of the finished bond was about four times the area of the interface between the two planes of truncation when abutted together before the welding.

It will be understood that the invention is not to be limited to the details given herein but that it may be modified within the scope of the appended claims.

The embodiments of the invention in which an exclusive property or privilege is claimed are defined as follows:

1. A method of welding a graphite-to-graphite interface, comprising exerting an initial pressure of about 14,000 p.s.i. across the interface, and while continuing said initial pressure, passing an alternating electrical current across said interface so as to produce a peak current density of from 310,000 to 1,000,000 amperes per square inch of interface thereby producing resistance heating, while simultaneously exerting a second pressure of such magnitude that the total pressure shall equal about 15,000 p.s.i. across the entire interface as enlarged by plasticity due to the resistance heating.

2. The method of claim 1 where the alternating current is at about 18.3 volts.

3. The method of claim 1 where the peak current density is about 310,000 amperes per square inch of interface.

4. The method of claim 1 where the peak current density is about 560,000 amperes per square inch of interface.

5. The method of claim 1 where the alternating current is at 60 cycles per second.

6. The method of claim 1 where the alternating current is pulsed through the interface for from 8 to about 50 milliseconds.

7. The method of claim 1 where the alternating current is pulsed through the interface for about 16.6 milliseconds.

8. The method of claim 1 where the alternating current is pulsed through the interface for about 33.2 milliseconds.

References Cited by the Examiner

UNITED STATES PATENTS

| 3,101,403 | 8/1963 | Lewis et al. | 219—117 |
|---|---|---|---|
| 3,106,596 | 10/1963 | Smallridge | 13—18 |

OTHER REFERENCES

"The Mecheleciv," November 1956, page 20, published by G.W.U. English School.

RICHARD M. WOOD, *Primary Examiner.*

B. A. STEIN, *Assistant Examiner.*